(12) United States Patent
Tang et al.

(10) Patent No.: US 12,493,528 B2
(45) Date of Patent: Dec. 9, 2025

(54) MEMORY SYSTEM, OPERATION METHOD OF MEMORY SYSTEM, AND MEMORY CONTROLLER

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN); Chaofan Xie, Wuhan (CN); Lu Guo, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/667,716

(22) Filed: May 17, 2024

(65) Prior Publication Data
US 2025/0231840 A1 Jul. 17, 2025

(30) Foreign Application Priority Data

Jan. 11, 2024 (CN) .......................... 202410048170.0

(51) Int. Cl.
*G06F 11/20* (2006.01)
*G06F 11/14* (2006.01)

(52) U.S. Cl.
CPC ...... *G06F 11/1458* (2013.01); *G06F 2201/84* (2013.01)

(58) Field of Classification Search
CPC ............. G06F 11/1458; G06F 11/1666; G06F 11/073; G06F 11/0793; G06F 11/0796
USPC ................. 714/6.1, 6.11, 6.13, 6.2, 6.3, 6.32
See application file for complete search history.

(56) References Cited

U.S. PATENT DOCUMENTS

| | | | |
|---|---|---|---|
| 11,704,211 B1 * | 7/2023 | Kaplan ............... | G06F 11/1666 714/6.13 |
| 2015/0317210 A1 * | 11/2015 | Palmer ................ | G06F 11/1441 714/6.3 |
| 2018/0189149 A1 * | 7/2018 | Alavi .................. | G06F 11/0727 |
| 2019/0180830 A1 * | 6/2019 | Natarajan .......... | G11C 16/3409 |
| 2019/0340068 A1 * | 11/2019 | Bhatia ..................... | G06F 7/588 |
| 2021/0405888 A1 * | 12/2021 | Park ..................... | G06F 11/1048 |
| 2022/0342563 A1 * | 10/2022 | Cariello ................ | G06F 3/0619 |
| 2023/0153215 A1 * | 5/2023 | Wu ....................... | G06F 3/0619 714/6.11 |

* cited by examiner

*Primary Examiner* — Chae M Ko
(74) *Attorney, Agent, or Firm* — Conley Rose, P.C.

(57) ABSTRACT

The present application provides a memory system, an operation method of a memory system, and a memory controller, and relates to the technical field of storage. In the solution provided by the present application, a memory comprises a plurality of blocks and at least one reserved block. Upon detecting a fail page among pages included in the plurality of blocks, a memory controller can acquire data in the fail page, and back up the data in the fail page to one backup page in the at least one reserved block.

20 Claims, 12 Drawing Sheets

MEMORY SYSTEM, OPERATION METHOD OF MEMORY SYSTEM, AND MEMORY CONTROLLER

CROSS-REFERENCE TO RELATED APPLICATIONS

The present application claims priority to Chinese Patent Application No. 2024100481700, which was filed on Jan. 11, 2024, is titled "MEMORY SYSTEM, OPERATION METHOD OF MEMORY SYSTEM, AND MEMORY CONTROLLER," and is hereby incorporated herein by reference in its entirety.

TECHNICAL FIELD

The present application relates to the field of memory technology, and in particular to a memory system, an operation method of a memory system, and a memory controller.

BACKGROUND

A NAND flash memory typically comprises a plurality of blocks, and each block comprises a plurality of pages. A minimum unit for data reading and writing is the page, and a minimum unit for data erasure is the block.

SUMMARY

The present application provides a memory system, an operation method of a memory system, and a controller, and may implement an analysis of a cause of a fail page in the memory. The technical solutions are as follows:

In a first aspect, a memory system is provided, which comprises a memory and a controller coupled to the memory, wherein the memory comprises a plurality of blocks and at least one reserved block, each of the plurality of blocks comprises a plurality of pages, and each of the at least one reserved block comprises a plurality of backup pages; the controller is configured to:
  acquire, in response to detecting a fail page among pages included in the plurality of blocks, data in the fail page; and
  back up the data in the fail page to one backup page in the at least one reserved block.
In an example, the fail page is a page where a data read error occurs; and the controller is configured to: recover the data in the fail page; and
  back up recovered data in the fail page to the one backup page in the at least one reserved block.
In an example, the controller is configured to:
  read other data in a redundant array of independent disks (RAID) stripe to which the fail page belongs than the data in the fail page; and
  recover the data in the fail page based on the other data.
In an example, the controller is configured to:
  perform low density parity check (LDPC) decoding, media cyclic redundancy check (MCRC) detection, de-scrambling, and exclusive-OR (XOR) processing sequentially for the other data to recover the data in the fail page; and
  perform scrambling, MCRC generation, and LDPC coding sequentially for the recovered data in the fail page, and program the recovered data into the one backup page in the at least one reserved block.
In an example, the fail page is a page where a data write error occurs; and the controller is configured to:
  acquire, from an internal memory of the controller, data to be written to the fail page; and
  back up the data to be written to the fail page to the one backup page in the at least one reserved block.
In an example, the controller is further configured to:
  label a block to which the fail page belongs as a grown bad block (GBB);
  read raw data in the fail page after performing garbage collection for the memory; and
  compare the raw data with the data in the one backup page in the at least one reserved block.
In an example, the controller is configured to:
  perform LDPC decoding, MCRC detection, and de-scrambling sequentially for the data in the one backup page in the at least one reserved block;
  generate a scrambling seed based on an address of the fail page;
  scramble de-scrambled data in the backup page based on the scrambling seed;
  perform MCRC generation and LDPC coding sequentially for scrambled data, and write the scrambled data to a cache of the controller; and
  compare the raw data with the data stored in the cache.
In an example, the controller is configured to:
  back up the data in the fail page to the one backup page in the at least one reserved block using a single level cell (SLC) mode or a triple level cell (TLC) mode.
In an example, the at least one reserved block belongs to a target stripe, and the target stripe comprises at least one factory bad block (FBB).
In a second aspect, an operation method of a memory system is provided, wherein the memory system comprises a controller and a memory, the memory comprises a plurality of blocks and at least one reserved block, each of the plurality of blocks comprises a plurality of pages, and each of the at least one reserved block comprises a plurality of backup pages; the method comprises:
  acquiring, by the controller in response to detecting a fail page among pages included in the plurality of blocks, data in the fail page; and
  backing up, by the controller, the data in the fail page to one backup page in the at least one reserved block.
In an example, the fail page is a page where a data read error occurs; backing up, by the controller, the data in the fail page to one backup page in the at least one reserved block comprises: recovering, by the controller, the data in the fail page;
  backing up, by the controller, recovered data in the fail page to the one backup page in the at least one reserved block.
In an example, recovering, by the controller, the data in the fail page comprises:
  reading, by the controller, other data in a RAID stripe to which the fail page belongs than the data in the fail page; and
  recovering, by the controller, the data in the fail page based on the other data.
In an example, recovering, by the controller, the data in the fail page based on the other data comprises:
  performing, by the controller, LDPC decoding, MCRC detection, de-scrambling, and exclusive-OR processing sequentially for the other data to recover the data in the fail page;
  backing up, by the controller, recovered data in the fail page to the one backup page in the at least one reserved block comprises:

performing scrambling, MCRC generation, and LDPC coding sequentially for the recovered data in the fail page and programming the recovered data into the one backup page in the at least one reserved block, by the controller.

In an example, the fail page is a page where a data write error occurs; backing up, by the controller, the data in the fail page to one backup page in the at least one reserved block comprises: acquiring, by the controller from an internal memory of the controller, data to be written to the fail page; and backing up, by the controller, the data to be written to the fail page to the one backup page in the at least one reserved block.

In an example, the method further comprises:
labelling, by the controller, a block to which the fail page belongs as a GBB;
reading, by the controller, raw data in the fail page after performing garbage collection for the memory; and
comparing the raw data with the data in the one backup page in the at least one reserved block.

In an example, comparing the raw data with the data in the one backup page in the at least one reserved block comprises:
performing LDPC decoding, MCRC detection and descrambling sequentially for the data in the one backup page in the at least one reserved block, by the controller;
generating, by the controller, a scrambling seed based on an address of the fail page;
scrambling, by the controller, de-scrambled data in the backup page based on the scrambling seed;
performing MCRC generation and LDPC coding sequentially for scrambled data and writing the scrambled data to a cache of the controller, by the controller; and
comparing the raw data with the data stored in the cache.

In an example, backing up, by the controller, the data in the fail page to one backup page in the at least one reserved block comprises:
backing up, by the controller, the data in the fail page to the one backup page in the at least one reserved block using an SLC mode or a TLC mode.

In a third aspect, a controller is provided, which comprises: a processor and an internal memory, wherein the internal memory is configured to store computer instructions, and the processor is configured to execute the computer instructions to implement the operation method of the memory system provided in the second aspect.

The technical solutions provided by the present application may comprise at least the following advantageous effects:

The present application provides a memory system, an operation method of a memory system, and a controller. In the memory system provided by the present application, the memory comprises a plurality of blocks and at least one reserved block. Upon detecting the fail page among the pages included in the plurality of blocks, the controller of the memory system can acquire the data in the fail page, and back up the data in the fail page to the one backup page in the at least one reserved block. As such, when a failure analysis for the fail page is required, the data can be read directly from the backup page for the failure analysis, so as to avoid leaving a risk in the memory system.

BRIEF DESCRIPTION OF THE DRAWINGS

The drawings to be used in description of examples will be briefly introduced below in order to illustrate the technical solutions in the examples of the present application more clearly. Apparently, the drawings described below are only some examples of the present application. Those of ordinary skill in the art may obtain other drawings according to these drawings without creative work.

DETAILED DESCRIPTION

Examples of the present application are further described below in detail in conjunction with the drawings.

Solutions provided by the examples of the present application are applicable to an electronic apparatus. The electronic apparatus may be a mobile terminal, a desktop computer, a laptop computer, a tablet, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having a memory therein.

Figure 1:
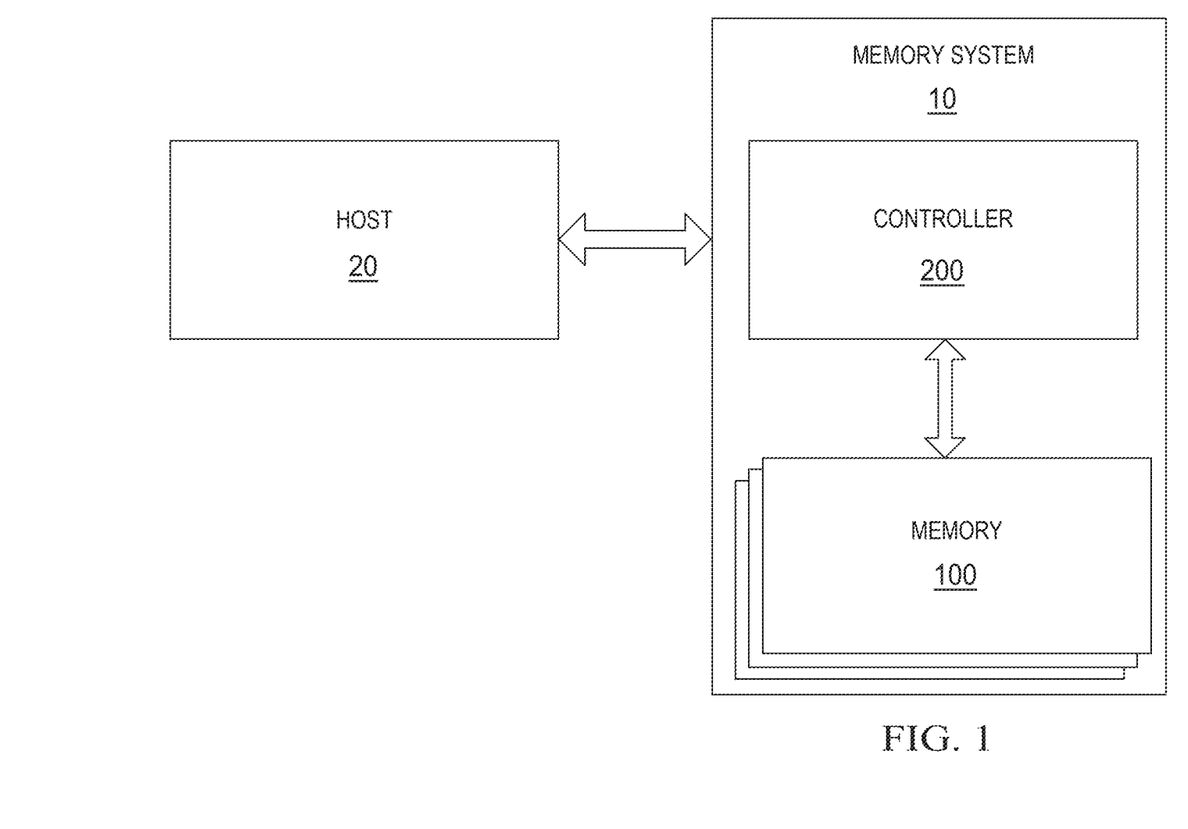
FIG. 1 is a schematic structural diagram of an electronic apparatus provided by examples of the present application.

FIG. 1 is a schematic structural diagram of an electronic apparatus provided by examples of the present application. As shown in FIG. 1, the electronic apparatus comprises a memory system 10 and a host 20, wherein the host 20 may be a central processing unit (CPU) or a system on chip (SoC) of the electronic apparatus. The host 20 is configured to send data to the memory system 10 for storage or read data from the memory system 10.

Examples of the present application further provide a memory system. With continued reference to FIG. 1, the memory system 10 comprises one or more memories (memory devices) 100 and a controller (memory controller) 200. For example, a plurality of memories 100 are illustrated in FIG. 1, wherein each memory 100 may be a 3-dimensional (3D) memory, which may be, e.g., a 3D NAND flash. Each of the memories 100 may comprise at least one memory plane, each memory plane comprises a plurality of blocks (memory blocks), and each block comprises a plurality of pages. The controller 200 is connected with the memory 100 and the host 20 respectively, and the controller 200 is configured to manage the data stored in the memory 100 and to communicate with the host 20.

In the examples of the present application, the controller 200 may be configured to control operations performed by the memory 100, such as read, erase and program operations. The controller 200 may be further configured to manage various functions with respect to data stored or to be stored in the memory 100, including, but not limited to, bad block management, garbage collection (GC), logical-to-physical address translation, and wear leveling, etc. In an example, the controller 200 may be further configured to process an error correcting code (ECC) with respect to data read from or written to the memory 100. The controller 200 may also perform any other suitable functions, e.g., formatting the memory 100.

The controller 200 may also communicate with an external apparatus according to a communication protocol. In an example, the controller 200 may communicate with an external apparatus through at least one of various interface protocols. The interface protocols may include a Universal Serial Bus (USB) protocol, a Multi-Media Card (MMC) protocol, a Peripheral Component Interconnect (PCI) protocol, a PCI-Express (PCI-E) protocol, an Advanced Technology Attachment (ATA) protocol, a serial ATA protocol, a parallel ATA protocol, a Small Computer System Interface (SCSI), an Enhanced Small Drive Interface (ESDI) protocol, an Integrated Development Environment (IDE) protocol, and a Fire Wire protocol, etc.

In some examples, the controller 200 and one or more memories 100 may be integrated in various types of memory apparatuses.

Figure 2:
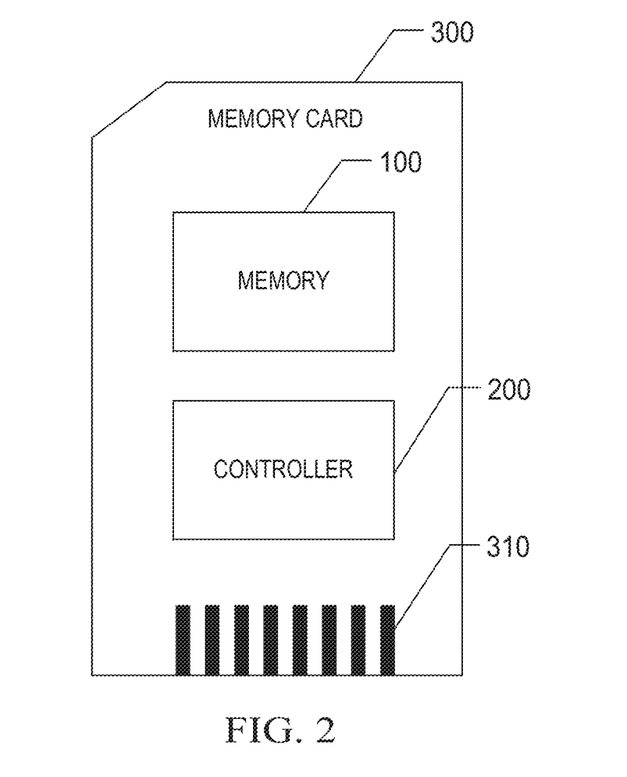
FIG. 2 is a schematic structural diagram of a memory card provided by examples of the present application.

As an example, as shown in FIG. 2, the controller 200 and a single memory 100 may be integrated into a memory card 300. The memory card 300 may include a Personal Computer Memory Card International Association (PCMCIA) card, a Compact Flash (CF) card, a Smart Media (SM) card, a memory stick, a Multi-Media Card (MMC), a Secure Digital (SD) card, and a Universal Flash Storage (UFS), etc. As shown in FIG. 2, the memory card 300 may also comprise a connector 310 for coupling with the host 20.

Figure 3:
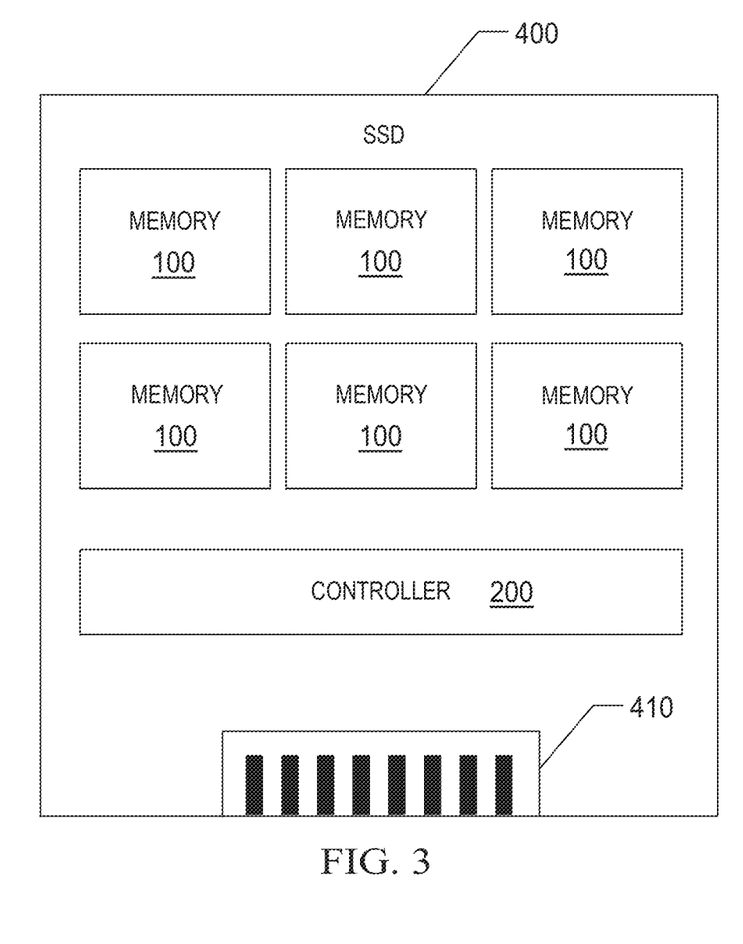
FIG. 3 is a schematic structural diagram of a solid state disk provided by examples of the present application.

As another example, as shown in FIG. 3, the controller 200 and a plurality of memories 100 may be integrated into a solid state disk (SSD) 400. The solid state disk 400 may also comprise a connector 410 for coupling with the host 20, wherein a storage capacity and/or an operation speed of the solid state disk 400 are greater than a storage capacity and/or an operation speed of the memory card 300.

Figure 4:
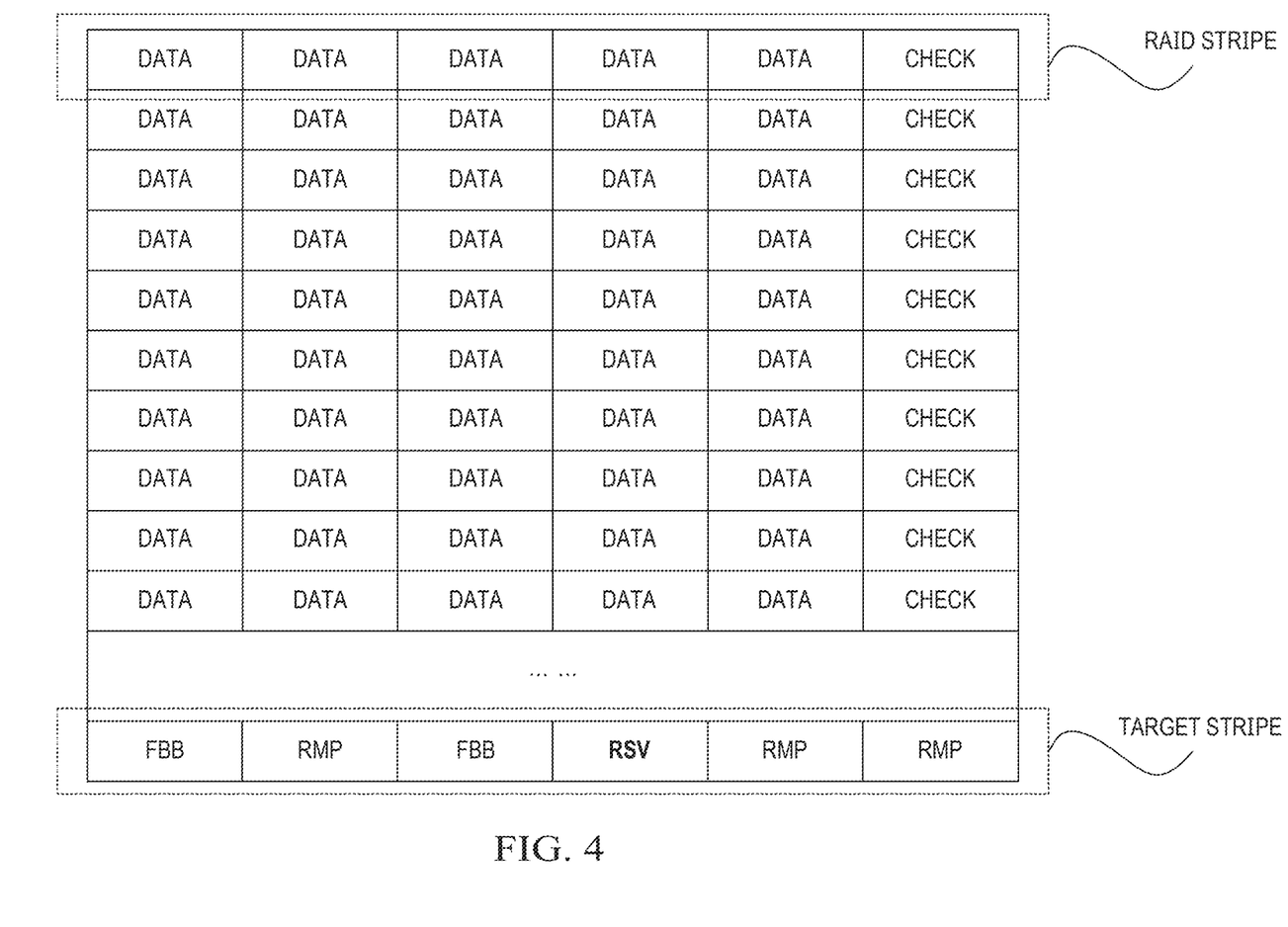
FIG. 4 is a schematic diagram of data stored in a memory provided by examples of the present application.

In order to improve the reliability of data storage, the memory system typically employs RAID striping technology to protect and recover data. FIG. 4 is a schematic diagram of data stored in a memory provided by examples of the present application. In FIG. 4, each row may be one RAID stripe, and each column may be one memory plane of the memory. As shown in FIG. 4, each RAID stripe may comprise a plurality of data portions and one check portion, and the plurality of data portions and the one check portion may be located in different memory planes of the memory. Each data portion is configured to store one piece of data DATA. The check portion is configured to store check data acquired by performing an exclusive-OR operation on multiple pieces of data DATA stored in the plurality of data portions, wherein the check data may be a parity block. In an example, the one piece of data DATA stored in each data portion may also be referred to as a code word, which may have a size of 2 kilobytes (K) or 4 kilobytes.

Figure 5:
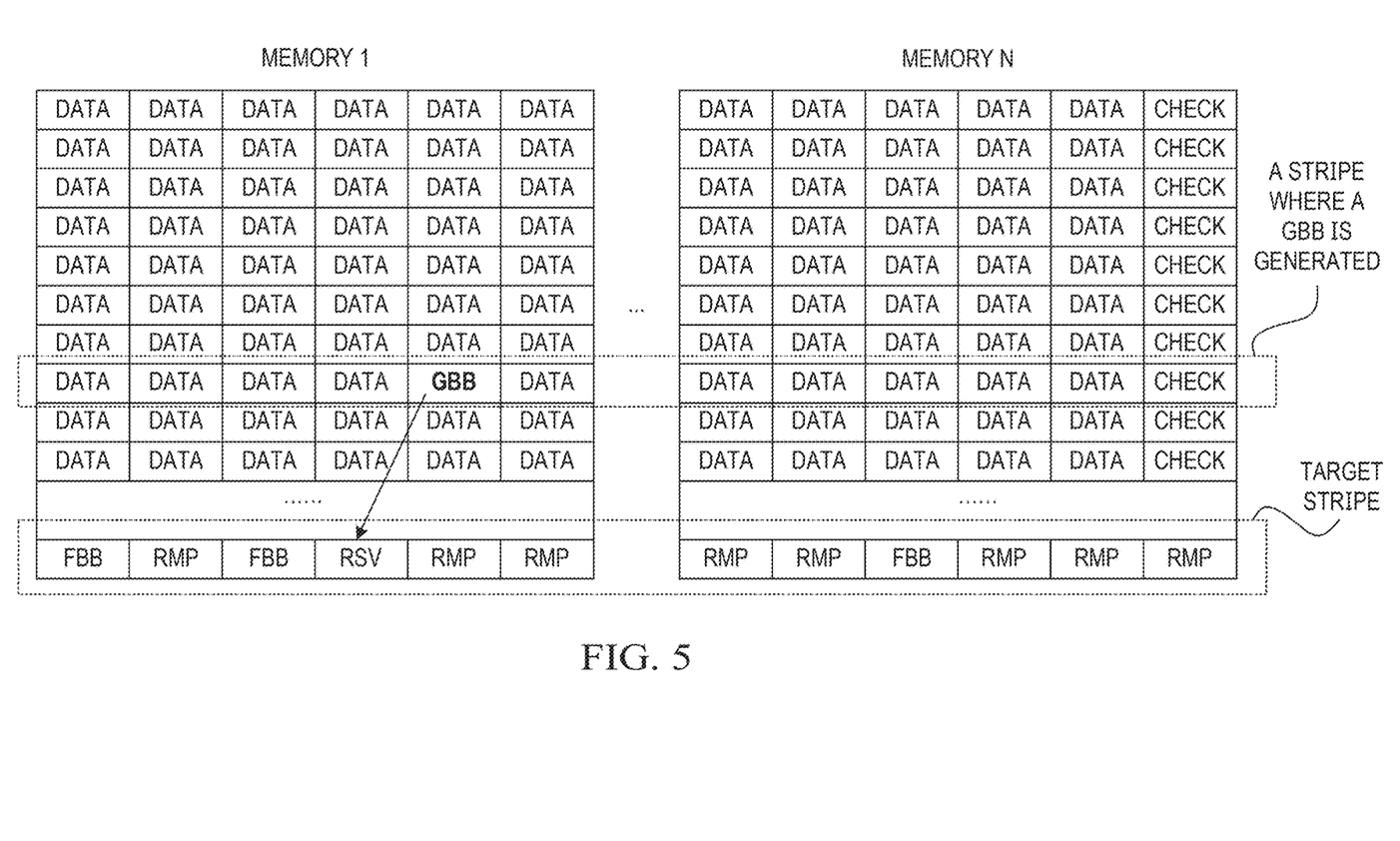
FIG. 5 is another schematic diagram of data stored in a memory provided by examples of the present application.

In an example, referring to FIG. 5, the plurality of data portions and the check portion included in each RAID stripe may also be distributed in different memories. For example, in a case shown in FIG. 5, the plurality of data portions and the check portion in each RAID stripe may be distributed in n different memories. n may be an integer greater than 1.

When a data read error occurs in any page in the memory, i.e., when a fail page occurs, the controller may read data stored in other pages in the RAID stripe to which the fail page belongs than the fail page, and may recover data of the fail page based on an inter-data exclusive-OR relationship. The data read error may refer to an uncorrectable ECC (UECC) error. It may be understood that since a size of each page in the memory may be greater than the size of the code word, there may be a plurality of RAID stripes to which the fail page belongs, i.e., one fail page may belong to a plurality of RAID stripes. For example, assuming that one page can store 4 code words, one fail page may belong to 4 RAID stripes.

After the fail page is detected, the controller may also label a block to which the fail page belongs as a GBB and trigger a garbage collection process. In the garbage collection process, the controller may rewrite valid data in a RAID stripe to which the GBB belongs to a new memory location, and may erase other blocks in the RAID stripe to which the GBB belongs than the GBB, i.e., the GBB is not involved in the garbage collection process.

Since the above garbage collection process erases data in the other blocks in the RAID stripe to which the GBB belongs than the GBB, an inter-data exclusive-OR relationship of the RAID stripe to which the GBB belongs is destroyed, rendering the data in the fail page in the GBB unrecoverable, i.e., a failure site is lost. After the failure site is lost, an effective analysis of a cause of the GBB cannot be implemented, that is, an effective analysis of a cause of the fail page cannot be implemented.

Figure 6:
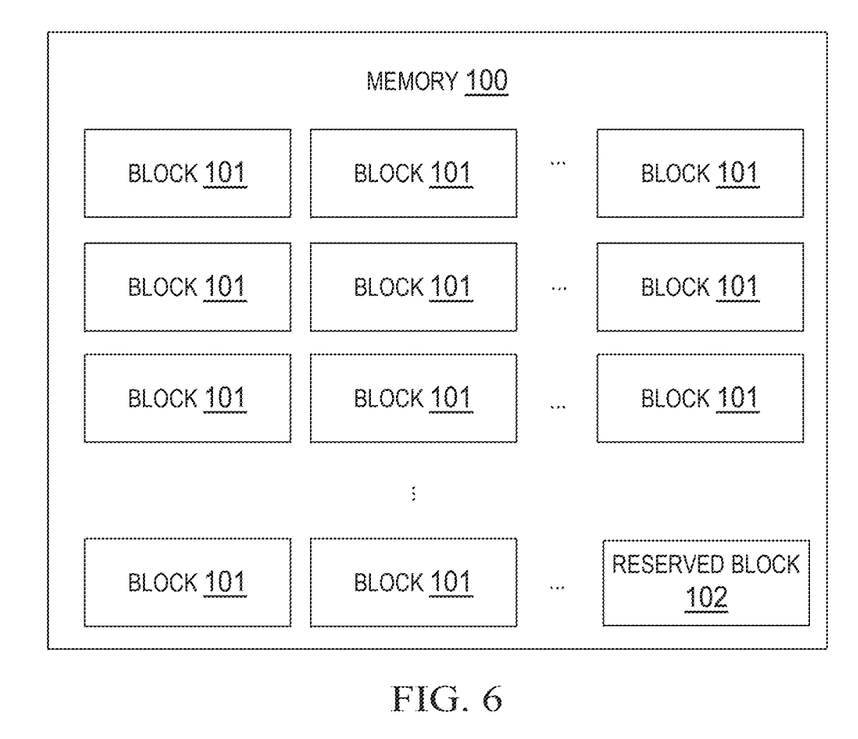
FIG. 6 is a schematic structural diagram of a memory provided by examples of the present application.

Examples of the present application provide an operation method of a memory system, wherein the method may back up data in a fail page for a subsequent analysis of a cause of the fail page, thus effectively improving the efficiency and accuracy of the failure analysis. The method is applicable to a memory system such as that shown in any of FIGS. 1 to 3. Moreover, as shown in FIG. 6, the memory 100 in the memory system may comprise a plurality of blocks 101 and at least one reserved (RSV) block 102. Each block 101 comprises a plurality of pages, and each reserved block 102 comprises a plurality of backup pages. The plurality of blocks 101 may be configured to store user data, that is, the plurality of blocks 101 may be user-addressable blocks. The at least one reserved block 102 may be dedicated to backing up the data of the fail page.

As a possible implementation, as shown in FIGS. 4 and 5, the at least one reserved block 102 (represented by RSV in FIGS. 4 and 5) may belong to a target stripe, which may be a stripe that includes an FBB. The FBB may refer to a bad block generated during memory production due to a preparation process, etc., i.e., a bad block that exists before leaving the factory. Other available blocks in the target stripe than the FBB are typically used to replace the GBB, i.e., the controller 200 may remap (RMP) the GBB to the available block. In the examples of the present application, one or more of the available blocks in the target stripe may be selected as the reserved block 102 dedicated to backing up the data in the fail page. For example, one or more available blocks may be reserved as the reserved block 102 during formation of a remap table.

As another possible implementation, the stripe to which the at least one reserved block 102 belongs may also comprise no FBB, that is, the at least one reserved block 102 may be reserved in other manners before leaving the factory. For example, the at least one reserved block 102 may be randomly selected among all available blocks of the memory.

Figure 7:
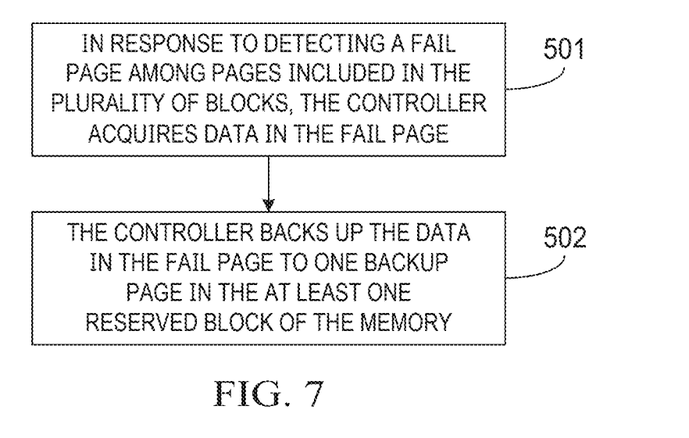
FIG. 7 is a flow diagram of an operation method of a memory system provided by examples of the present application.

The operation method of a memory system provided by the examples of the present application is described below. As shown in FIG. 7, the method may comprise:

In operation 501, in response to detecting a fail page among pages included in the plurality of blocks, the controller acquires data in the fail page.

In the examples of the present application, upon detecting a data read error or a data write error in any page in the memory, the controller may determine that the page is a fail page.

In a first possible implementation, when a data write error occurs (i.e., a programming status failed (PSF)) during data writing to any page performed by the controller, the controller may determine that the page is a fail page. Furthermore, the controller may acquire, directly from an internal memory thereof, data to be written to the fail page. The internal memory of the controller may be a static random access memory (SRAM).

In a second possible implementation, if a data read error occurs when reading data from any page performed by the controller, i.e., a data reading UECC error occurs, the controller may determine that the page is a fail page. Furthermore, the controller may recover the data in the fail page to acquire the data in the fail page.

As an example of the second implementation, the data in the fail page may be data subjected to data protection using a RAID technology. Accordingly, after detecting the fail page, the controller may read other data in a RAID stripe to which the fail page belongs than the data in the fail page. Subsequently, the data in the fail page may be recovered based on the read other data.

Figure 8:
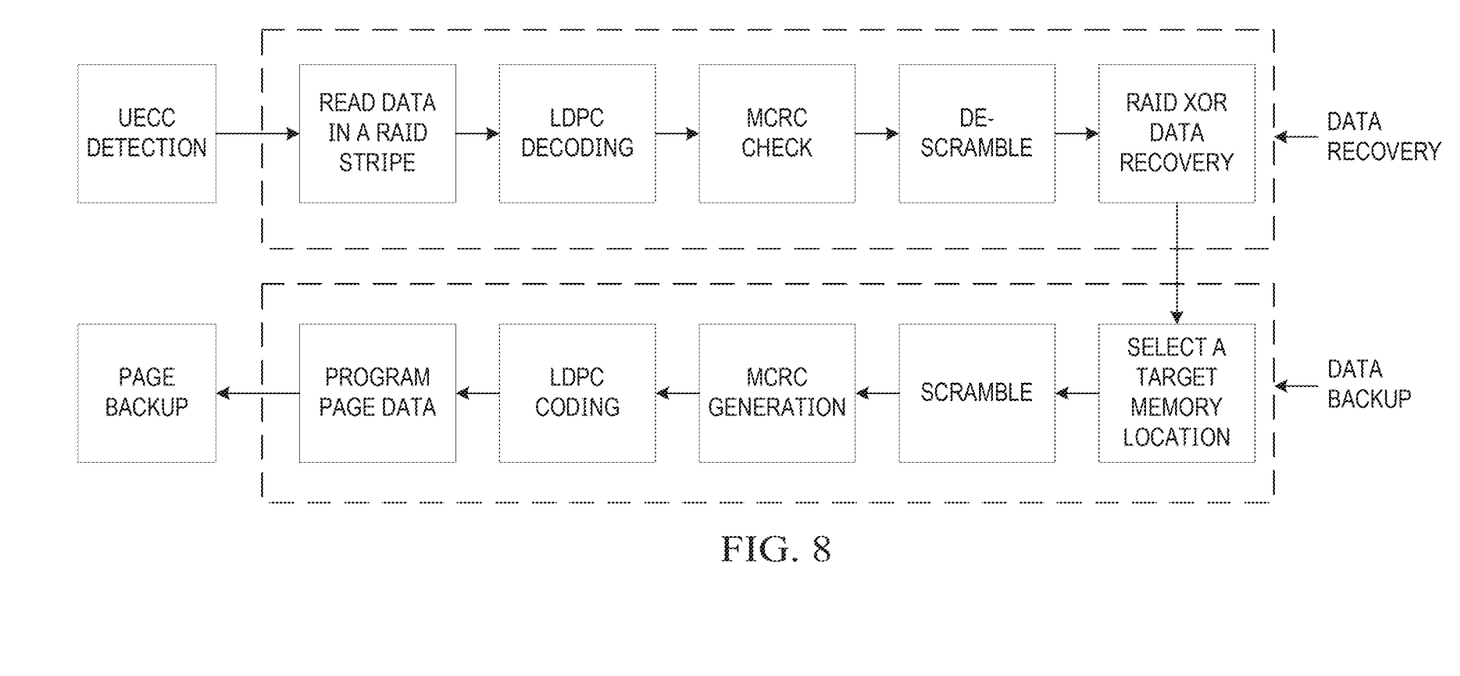
FIG. 8 is a schematic diagram of data recovery and data backup processes provided by examples of the present application.

In an example, referring to FIG. 8, the controller may perform LDPC decoding, MCRC detection, de-scrambling, and exclusive-OR processing sequentially for the other data in the RAID stripe to recover the data in the fail page.

It may be understood that the fail page may comprise a plurality of code words, and if only part of the code words in the fail page are subjected to a UECC error when reading data, the controller may read data of a RAID stripe to which the part of the code words subjected to the UECC error belong, and recover the part of the code words subjected to the UECC error. That is, other code words in the fail page that can be read correctly do not require a data recovery using a RAID stripe.

As another example of the second implementation, the data in the fail page may be data subjected to data protection using a backup strategy. The backup strategy may refer to storing the same piece of data in a plurality of different memory locations (e.g., a plurality of different memory planes) of the memory, so as to ensure that, if data in any of the memory locations is damaged, the data may be read from other memory locations. For example, the backup strategy may be used for data protection of important system data in the memory system, such as a logical-to-physical mapping (L2P) table. In this example, the controller may directly acquire data from a backup memory location corresponding to the fail page, and the acquired data is the data in the fail page.

In operation 502, the controller backs up the data in the fail page to one backup page in the at least one reserved block of the memory.

After acquiring the data in the fail page, the controller may back up the data to the one backup page in the at least one reserved block. As such, failure site data may be retained effectively, thereby increasing the efficiency of the subsequent failure analysis.

Exemplarily, referring to FIG. 8, the controller may first determine a target memory location, i.e., determine the one backup page from the at least one reserved block for storing the data. Then, the controller may program the acquired data in the fail page into the backup page.

It may be understood that for each reserved block, the controller may back up the data into the backup pages sequentially in an order of the backup pages in the reserved block. That is, after writing data into a certain backup page and if detecting a fail page again, the controller may write data of the fail page to a next backup page. Accordingly, the above target memory location may refer to a next backup page following a backup page of a last time of writing. It may be also understood that if a memory space of a certain reserved block is full, the controller may continue to back up data in a next reserved block.

On the one hand, if the data in the fail page is the to-be-written data that is acquired by the controller from its internal memory or data recovered based on the RAID stripe, as shown in FIG. 8, the controller may perform scrambling, MCRC generation, and LDPC coding sequentially for the acquired data, and program the acquired data into the backup page.

On the other hand, if the data in the fail page is acquired by the controller directly from the backup memory location corresponding to the fail page based on the backup strategy, the controller may first perform LDPC decoding, MCRC detection, and de-scrambling for the acquired data. Subsequently, the controller may perform scrambling, MCRC generation, and LDPC coding sequentially for the de-scrambled data, and program it into the backup page.

In an example, in the examples of the present application, the controller may back up the data in the fail page to the one backup page in the at least one reserved block using an SLC mode or a TLC mode. The SLC mode may reduce a probability of a bit flip effectively to ensure the security of data storage. The TLC mode may improve the utilization of a memory space effectively to ensure that a relatively large amount of backup data is written to one reserved block.

Figure 9:
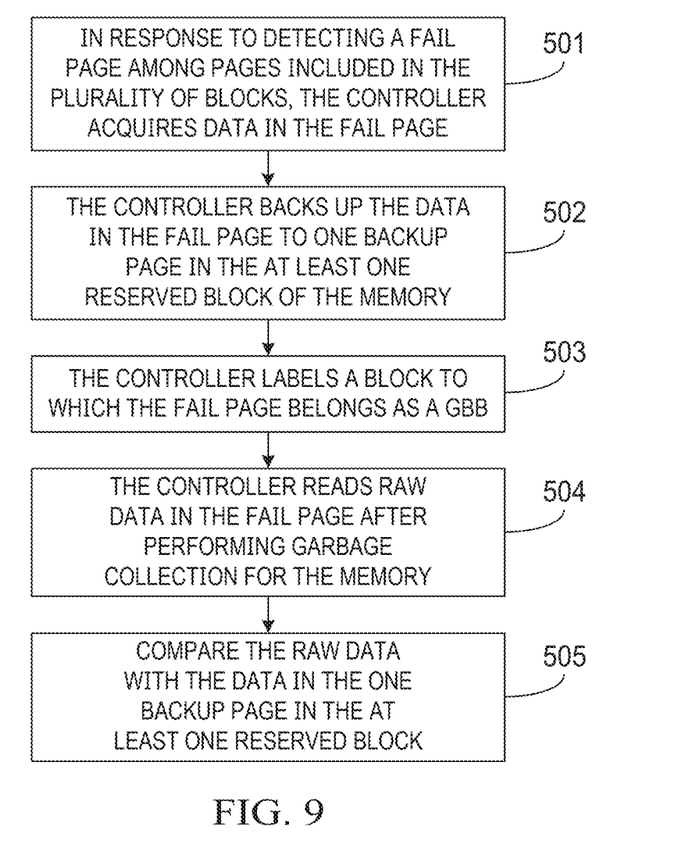
FIG. 9 is another flow diagram of an operation method of a memory system provided by examples of the present application.

With continued reference to FIG. 9, the operation method of a memory system provided by the examples of the present application may further comprise:

In operation 503, the controller labels a block to which the fail page belongs as a GBB.

In the examples of the present application, after detecting the fail page, the controller may label the block to which the fail page belongs as the GBB.

In operation 504, the controller reads raw data in the fail page after performing garbage collection for the memory.

Figure 10:
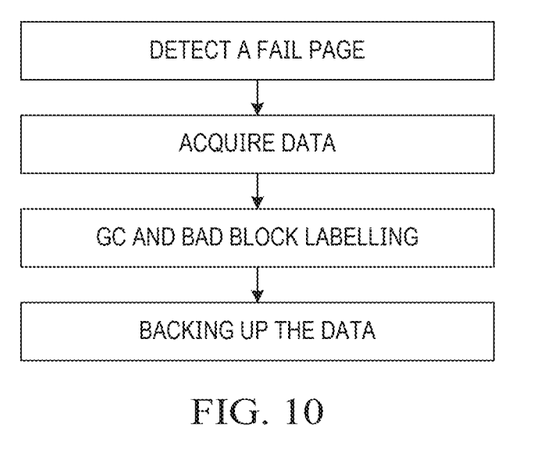
FIG. 10 is still another flow diagram of an operation method of a memory system provided by examples of the present application.

It may be understood that, as shown in FIG. 10, the controller typically triggers a garbage collection process after labelling a bad block in the memory. For example, if the memory system protects data using the RAID technology, the controller may migrate the data in the RAID stripe to which the GBB belongs through the garbage collection process, and erase data in other blocks in the RAID stripe to which the GBB belongs than the GBB.

After performing a garbage collection operation, the controller may read the raw data in the fail page if the analysis of the cause of the GBB, i.e., the failure cause of the fail page, is require. It may be understood that, the controller may read the raw data in the fail page without the processes of LDPC decoding, MCRC detection, and de-scrambling, etc., and no data read error occurs.

In operation 505, the raw data is compared with the data in the one backup page in the at least one reserved block.

In the examples of the present application, the controller may read, from the backup page, the data in the fail page that is backed up by the controller. Subsequently, the data may be compared with the raw data in the fail page for an analysis, so as to clarify the failure cause.

Figure 11:
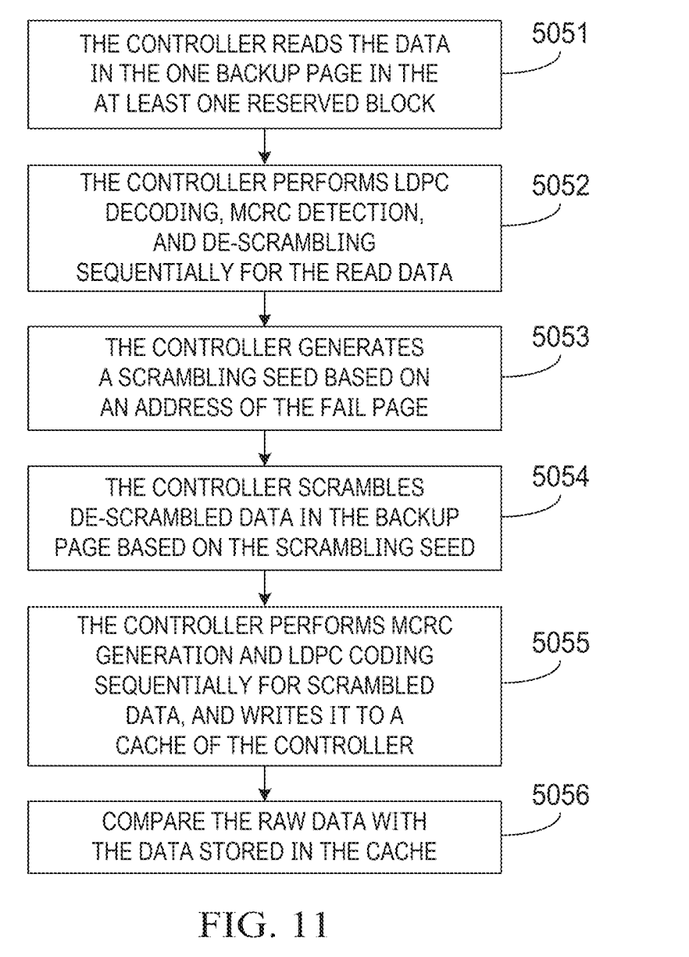
FIG. 11 is a flow diagram of a data comparison method provided by examples of the present application.

In an example, referring to FIG. 11, an implementation process of above operation 505 may comprise:

In operation 5051, the controller reads the data in the one backup page in the at least one reserved block.

For the GBB to be analyzed, the controller may determine, from the at least one reserved block, the backup page for storing the data of the fail page in the GBB, and read the data in the backup page.

In operation 5052, the controller performs LDPC decoding, MCRC detection, and de-scrambling sequentially for the read data.

Figure 12:
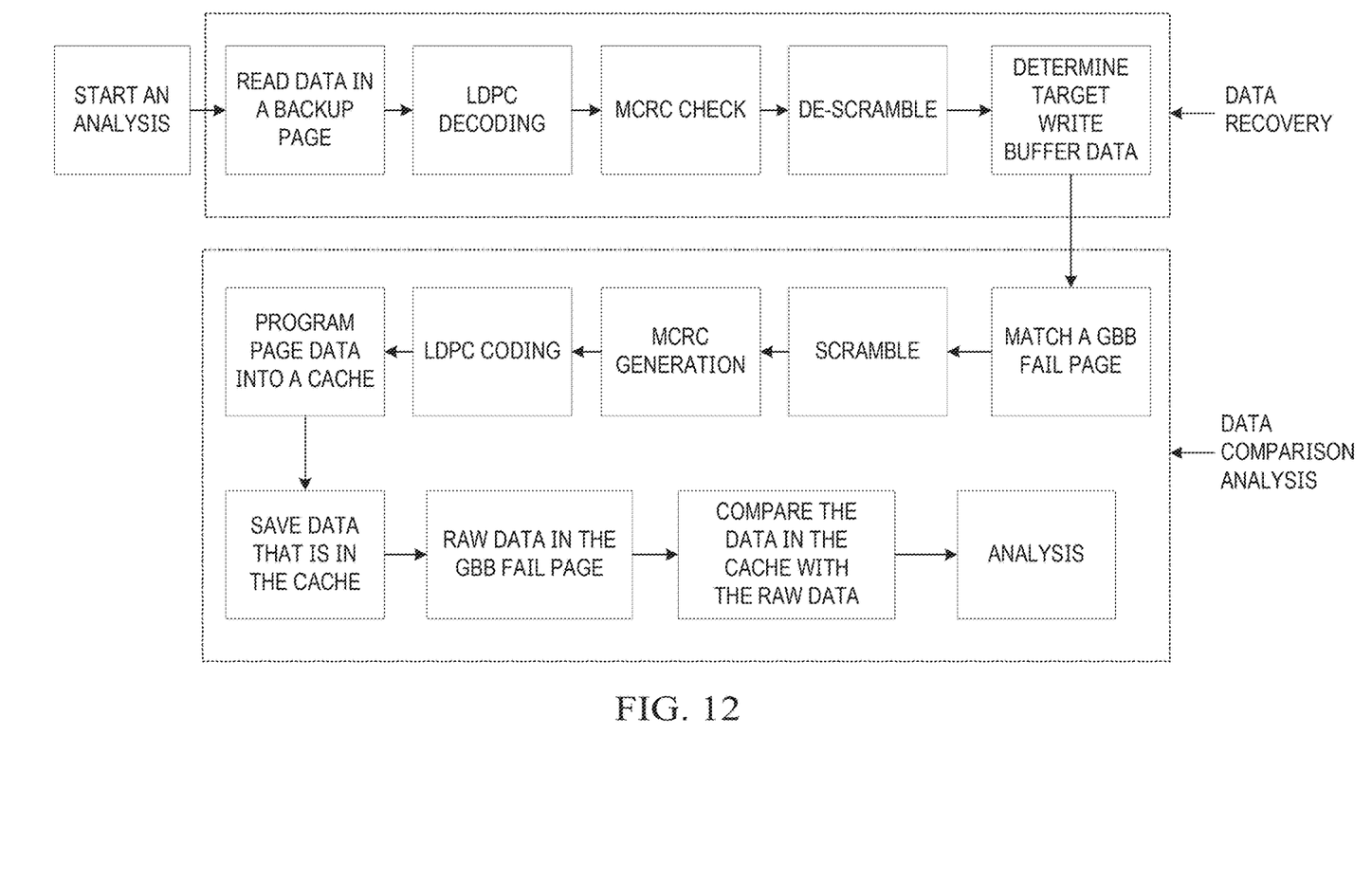
FIG. 12 is a schematic diagram of data recovery and data comparison analysis processes provided by examples of the present application.

Referring to FIG. 12, after reading the data in the backup page, the controller may perform the LDPC decoding, the MCRC detection, and the de-scrambling sequentially for the read data, so as to recover the initial data, which may also be referred to as target write buffer data.

In operation 5053, the controller generates a scrambling seed based on an address of the fail page.

It may be understood that, when writing the initial data to a page, the controller may randomly generate one scrambling seed based on a location of the page (i.e., a memory location of the initial data), and scramble the initial data based on the scrambling seed. Since different memory locations correspond to different scrambling seeds, there are different scrambled results for the same piece of initial data.

It can be seen that, the same piece of initial data have different stored contents at different memory locations in the memory, that is, the same piece of initial data has a stored content in the fail page that is different from a stored content in the backup page. On this basis, the controller is required to perform a match for the fail page in the GBB, and generate the scrambling seed based on the address of the fail page.

In operation 5054, the controller scrambles de-scrambled data in the backup page based on the scrambling seed.

After generating the scrambling seed, the controller may scramble the de-scrambled data (i.e., the initial data or target write buffer data) in the backup page based on the scrambling seed.

In operation 5055, the controller performs MCRC generation and LDPC coding sequentially for scrambled data, and writes it to a cache of the controller.

The controller may also perform the MCRC generation and LDPC coding sequentially for the scrambled data, so as to acquire data to be written to the fail page. However, the fail page has failed, therefore as shown in FIG. 12, the controller may write the data after the scrambling, MCRC generation and LDPC coding to the cache of the controller, and stores the data that is in the cache. As such, the controller may simulate a process of writing the initial data to the fail page to obtain correct data to be stored in the fail page originally.

In operation 5056, the raw data is compared with the data stored in the cache.

Since the data stored in the cache is the correct data to be stored in the fail page originally in the fail page, the failure cause of the fail page, i.e., the cause of the GBB, may be determined after analysis by comparing the data stored in the cache with the raw data in the fail page. In an example, a process of the comparison analysis may be performed by a tester or may be implemented by a comparison analysis script, which is not limited in the examples of the present application.

It may be understood that, in most cases there is only one fail page in one GBB, e.g., there is only one UECC page. Assuming that each block in the memory comprises 1392 SLC pages, then one reserved block may store data in fail pages of 1392 GBBs, causing a storage capacity much larger than a normal demand. It may be also understood that, if the storage space of the at least one reserved block that is reserved is full, the controller may stop further writing and perform a debug analysis timely.

For example, for a fail page where a UECC occurs, a data shift error present in the fail page may be detected based on data recovery and comparison processes shown in above operations 5051 to 5056, thus further promoting the analysis to determine that an error occurs in a logic domain of the controller. As such, the efficiency of the failure analysis is improved effectively.

In summary, the examples of the present application provide an operation method of the memory system, wherein the memory of the memory system comprise a plurality of blocks and at least one reserved block. Upon detecting the fail page among the pages included in the plurality of blocks, the controller of the memory system can acquire the data in the fail page, and back up the data in the fail page to the one backup page in the at least one reserved block. As such, when a failure analysis for the fail page is required, the data can be read directly from the backup page for the failure analysis, so as to avoid leaving a risk in the memory system.

Figure 13:
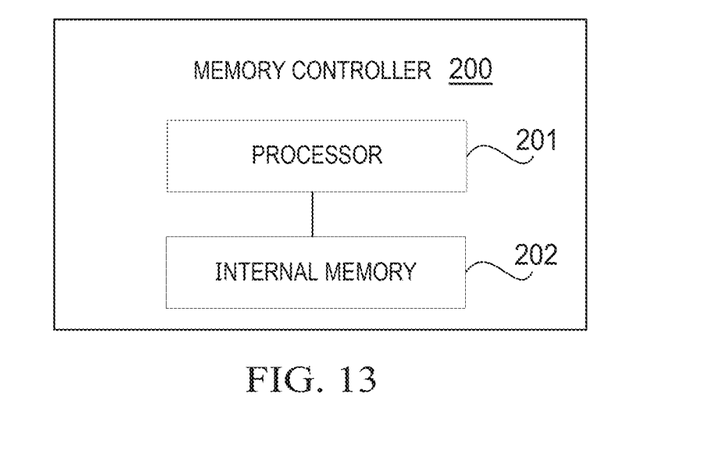
FIG. 13 is a schematic structural diagram of a controller provided by examples of the present application.

FIG. 13 is a schematic structural diagram of a controller provided by examples of the present application. The controller is applicable to cases such as those shown in FIGS. 1 to 3. As shown in FIG. 13, the controller 200 comprises a processor 201 and an internal memory (cache) 202. The internal memory 202 is configured to store computer instructions, and the processor 201 is configured to execute the computer instructions to implement the operation method of the memory system provided by the above examples. In an example, the processor 201 may be a Micro-Controller Unit (MCU), etc.

The controller 200 may be configured to implement functions of the controller in the above examples to implement functions of the memory system provided by the examples of the present application. The implementations may be referred to the examples shown in FIGS. 7, 9 and 11, which are no longer described in detail here.

Examples of the present application further provide a computer-readable storage medium having instructions stored thereon, which, when executed by a processor in the controller, may implement any of the operations in the operation method of the memory system provided by the above examples.

Examples of the present application further provide a computer program product containing instructions, which, when executed by a processor of the controller, may implement any of the operations in the operation method of the memory system provided by the above examples.

In the present application, the terms "first" and "second" are only for the purpose of description, and cannot be construed as indicating or implying relative importance. The term "at least one" means one or more, and the term "a plurality of" means two or more, unless otherwise defined clearly.

The above descriptions are merely exemplary examples of the present application, and are not intended to limit the present application. The protection scope of the present application shall be subject to the protection scope of the claims.

What is claimed is:

1. A memory system, comprising:
a memory device comprising memory blocks and at least one reserved block, each of the memory blocks comprising pages, and each of the at least one reserved block comprising backup pages; and
a memory controller coupled to the memory device and configured to:
in response to detecting a fail page among the pages in the memory blocks, acquire data in the fail page; and
back up the data in the fail page to one backup page in the at least one reserved block, wherein the at least one reserved block belongs to a target stripe, and the target stripe comprises at least one factory bad block (FBB).

2. The memory system of claim 1, wherein the fail page is a page where a data read error occurs; and the memory controller is configured to:
recover the data in the fail page; and
back up recovered data in the fail page to the one backup page in the at least one reserved block.

3. The memory system of claim 2, wherein the memory controller is configured to:
read other data in a redundant array of independent disks (RAID) stripe to which the fail page belongs than the data in the fail page; and
recover the data in the fail page based on the other data.

4. The memory system of claim 3, wherein the memory controller is configured to:
perform low density parity check (LDPC) decoding, media cyclic redundancy check (MCRC) detection, de-scrambling, and XOR processing sequentially for the other data to recover the data in the fail page; and
perform scrambling, MCRC generation, and LDPC coding sequentially for the recovered data in the fail page, and program the recovered data into the one backup page in the at least one reserved block.

5. The memory system of claim 1, wherein the fail page is a page where a data write error occurs; and the memory controller is configured to:
acquire, from a cache of the memory controller, data to be written to the fail page; and
back up the data to be written to the fail page to one backup page in the at least one reserved block.

6. The memory system of claim 1, wherein the memory controller is further configured to:
label a block to which the fail page belongs as a grown bad block (GBB);
read raw data in the fail page after performing garbage collection for the memory device; and
compare the raw data with the data in the one backup page in the at least one reserved block.

7. The memory system of claim 6, wherein the memory controller is configured to:
perform LDPC decoding, MCRC detection, and de-scrambling sequentially for the data in the one backup page in the at least one reserved block;
generate a scrambling seed based on an address of the fail page;
scramble de-scrambled data in the one backup page based on the scrambling seed;
perform MCRC generation and LDPC coding sequentially for scrambled data, and write the scrambled data to a cache of the memory controller; and
compare the raw data with the data stored in the cache.

8. The memory system of claim 1, wherein the memory controller is configured to:
back up the data in the fail page to the one backup page in the at least one reserved block using a single level cell (SLC) mode and a triple level cell (TLC) mode.

9. A method of operating a memory system, wherein the memory system comprises a memory controller and a memory device; and the method comprising:
in response to detecting a fail page in memory blocks, acquiring, by the memory controller, data in the fail page,
wherein the memory device comprises the memory blocks and at least one reserved block, each of the memory blocks comprises pages, and each of the at least one reserved block comprises backup pages;
backing up, by the memory controller, the data in the fail page to one backup page in the at least one reserved block;
labelling, by the memory controller, a block to which the fail page belongs as a grown bad block (GBB);
reading, by the memory controller, raw data in the fail page after performing garbage collection for the memory device; and
comparing the raw data with the data in the one backup page in the at least one reserved block.

10. The method of claim 9, wherein the fail page is a page where a data read error occurs; and backing up, by the memory controller, the data in the fail page to one backup page in the at least one reserved block comprises:
recovering, by the memory controller, the data in the fail page; and
backing up, by the memory controller, recovered data in the fail page to the one backup page in the at least one reserved block.

11. The method of claim 10, wherein recovering, by the memory controller, the data in the fail page comprises:
reading, by the memory controller, other data in a RAID stripe to which the fail page belongs than the data in the fail page; and
recovering, by the memory controller, the data in the fail page based on the other data.

12. The method of claim 11, wherein recovering, by the memory controller, the data in the fail page based on the other data comprises:
performing, by the memory controller, LDPC decoding, MCRC detection, de-scrambling, and XOR processing sequentially for the other data to recover the data in the fail page; and
backing up, by the memory controller, recovered data in the fail page to the one backup page in the at least one reserved block comprises:
performing scrambling, MCRC generation, and LDPC coding sequentially for the recovered data in the fail page and programming the recovered data into the one backup page in the at least one reserved block, by the memory controller.

13. The method of claim 9, wherein the fail page is a page where a data write error occurs; and backing up, by the memory controller, the data in the fail page to one backup page in the at least one reserved block comprises:
acquiring, by the memory controller from a cache of the memory controller, data to be written to the fail page; and
backing up, by the memory controller, the data to be written to the fail page to the one backup page in the at least one reserved block.

14. The method of claim 9, wherein comparing the raw data with the data in the one backup page in the at least one reserved block comprises:
performing, by the memory controller, LDPC decoding, MCRC detection, and de-scrambling sequentially for the data in the one backup page in the at least one reserved block;
generating, by the memory controller, a scrambling seed based on an address of the fail page;
scrambling, by the memory controller, de-scrambled data in the one backup page based on the scrambling seed;
performing MCRC generation and LDPC coding sequentially for scrambled data and writing the scrambled data to a cache of the memory controller, by the memory controller; and
comparing the raw data with the data stored in the cache.

15. The method of claim 9, wherein backing up, by the memory controller, the data in the fail page to one backup page in the at least one reserved block comprises:
backing up, by the memory controller, the data in the fail page to the one backup page in the at least one reserved block using an SLC mode and a TLC mode.

16. A memory controller, comprising:
a processor; and
a cache configured to store computer instructions,
wherein the processor is configured to execute the computer instructions to:
in response to detecting a fail page in memory blocks in a memory device coupled to the memory controller, acquire data in the fail page,
wherein the memory device comprises the memory blocks and at least one reserved block, each of the memory blocks comprises pages, and each of the at least one reserved block comprises backup pages; and
back up the data in the fail page to one backup page in the at least one reserved block, wherein the at least one reserved block belongs to a target stripe, and the target stripe comprises at least one factory bad block (FBB).

17. The memory controller of claim 16, wherein the fail page is a page where a data read error occurs; and the processor is further configured to execute the computer instructions to:
recover the data in the fail page; and
back up recovered data in the fail page to the one backup page in the at least one reserved block.

18. The memory controller of claim 17, wherein the processor is further configured to execute the computer instructions to:
read other data in a redundant array of independent disks (RAID) stripe to which the fail page belongs than the data in the fail page; and
recover the data in the fail page based on the other data.

19. The memory controller of claim 17, wherein the memory controller is configured to:
perform low density parity check (LDPC) decoding, media cyclic redundancy check (MCRC) detection, de-scrambling, and XOR processing sequentially for the other data to recover the data in the fail page; and
perform scrambling, MCRC generation, and LDPC coding sequentially for the recovered data in the fail page, and program the recovered data into the one backup page in the at least one reserved block.

20. The memory controller of claim 16, wherein the fail page is a page where a data write error occurs; and the memory controller is configured to:
acquire, from a cache of the memory controller, data to be written to the fail page; and
back up the data to be written to the fail page to one backup page in the at least one reserved block.

* * * * *